(12) United States Patent
Aemisegger et al.

(10) Patent No.: US 8,915,317 B2
(45) Date of Patent: Dec. 23, 2014

(54) TRAILER MANEUVERING DRIVE

(71) Applicant: Truma Gerätetechnik GmbH & Co. KG, Putzbrunn (DE)

(72) Inventors: Steve Aemisegger, Munich (DE); Daniel Gumpp, Weil (DE); Jochen Mueller, Moosach (DE); Tobias Schmid, Erding (DE); Klaus Muessler, Egenburg (DE); Ana Maria Fernandez, Munich (DE); Joerg Mueller, Egmating (DE); Oliver Schaurer, Oberding (DE); Mario Moehring, Gammelsdorf (DE); Mathias Venschott, Munich (DE)

(73) Assignee: Truma Gerätetechnik GmbH & Co. KG, Putzbrunn (DE)

( * ) Notice: Subject to any disclaimer, the term of this patent is extended or adjusted under 35 U.S.C. 154(b) by 0 days.

(21) Appl. No.: 13/903,595

(22) Filed: May 28, 2013

(65) Prior Publication Data
US 2013/0324356 A1 Dec. 5, 2013

(30) Foreign Application Priority Data
May 29, 2012 (DE) .......................... 10 2012 010 546

(51) Int. Cl.
*F16H 13/02* (2006.01)
*B62D 59/04* (2006.01)

(52) U.S. Cl.
CPC ..................................... *B62D 59/04* (2013.01)
USPC ........................................... 180/16; 180/341

(58) Field of Classification Search
USPC ......................................... 180/16, 341, 206.8
See application file for complete search history.

(56) References Cited

U.S. PATENT DOCUMENTS

| RE39,179 E * | 7/2006 | Naunheimer et al. ............. 475/5 |
| 7,766,387 B1 * | 8/2010 | Rosenbalm et al. .......... 280/757 |
| 2005/0189155 A1 * | 9/2005 | Bender et al. ................... 180/15 |

FOREIGN PATENT DOCUMENTS

| DE | 20 2005 006 693 U1 | 9/2005 |
| DE | 20 2005 015 876 U1 | 2/2006 |
| DE | 20 2009 001 675 U1 | 12/2009 |
| DE | 20 2010 008 600 U1 | 2/2012 |
| EP | 1225090 A2 | 7/2002 |
| EP | 1714858 A1 | 10/2006 |
| EP | 2208661 A1 | 1/2009 |

* cited by examiner

*Primary Examiner* — Kevin Hurley
(74) *Attorney, Agent, or Firm* — McNees Wallace & Nurick LLC

(57) ABSTRACT

A maneuvering drive for a trailer includes a fastening means for fastening to the trailer, a carrier movable relative to the fastening means, a drive motor held by the carrier, a drive roller rotatable drivable by the drive motor and a braking means for braking a rotary movement of the drive roller. The drive motor and the braking means are arranged coaxially to each other. In the flux of force between the drive motor and the drive roller a transmission device is provided, which has no self-locking feature.

14 Claims, 7 Drawing Sheets

TRAILER MANEUVERING DRIVE

TECHNICAL FIELD

This invention relates to a maneuvering drive for a trailer.

BACKGROUND OF THE INVENTION

Trailers usually are towed by tractors. It is known, for example, that a passenger car can tow a caravan. When the trailer is removed from the tractor, it mostly is pushed into the final position by hand. Nowadays, however, there are more and more offered trailers in the caravan sector, which due to their size and hence there weight only can be shifted by hand with great effort. Therefore, maneuvering or auxiliary drives have been developed, which provide for shifting or turning a trailer even without tractor with the aid of a motor.

EP 1 714 858 A1 describes a maneuvering drive for a vehicle trailer with unilaterally supported drive roller. The maneuvering drive includes a carrier movable relative to a chassis of the trailer, which carries a drive motor and a drive roller. A moving mechanism serves for moving the carrier between a rest position, in which the drive roller is separated from a wheel of the trailer, and a drive position in which the drive roller is pressed against the wheel of the trailer. The drive motor drives the drive roller via a transmission.

From DE 20 2009 001 675 U1 a maneuvering drive with a braking means is known. The braking means acts in a transmission which transmits the drive power of two drive motors to the drive roller. The construction of the maneuvering drive requires considerable installation space.

From EP 2 208 661 A1 a maneuvering drive is known, in which both the drive motor and the transmission are arranged inside the drive roller. The drive motor can be a brushless electric motor. The construction of the maneuvering drive is very compact, but requires quite a considerable technical effort.

Due to the limited space available on the bottom side of a trailer, in particular in the region of the trailer wheels or wheelhouses, a maneuvering drive is desirable, which only makes minimal demands on the required installation space.

It is the object underlying the invention to indicate a maneuvering drive for a trailer, which provides for a simple and yet compact construction.

SUMMARY OF THE INVENTION

The present invention provides a maneuvering drive for a trailer, with a fastening means for fastening to the trailer, a carrier movable relative to the fastening means, a drive motor held by the carrier, a drive roller rotatably drivable by the drive motor, and with a braking means for braking a rotary movement of the drive roller, is characterized in that the drive motor and the braking means are arranged coaxially to each other and that in the flux of force between the drive motor and the drive roller a transmission means is provided, which has no self-locking feature.

The maneuvering drive can include a moving means for moving the carrier between a rest position, in which the drive roller is separated from a wheel of the trailer, and a drive position in which the drive roller is pressed against the wheel of the trailer.

The maneuvering drive may include the carrier movable relative to the fastening means, which carries the drive motor and the drive roller. By means of the moving means, the carrier can be reciprocated between the rest position and the drive position, so that the drive roller is pressed against the wheel of the trailer, e.g. against the tread of the trailer wheel or is lifted off from the wheel, when necessary. This construction is known for example from EP 1 714 858 A1.

Due to the coaxial arrangement of the drive motor and the braking means ("in-line arrangement"), the two components can be arranged very close to each other and possibly even be constructed as one unit. This provides for a simplified assembly, in that for example the drive motor and the braking means can be preassembled. In addition, an extremely compact construction can be realized. In this connection it should be noted that in prior art maneuvering drives there has always been used a self-locking transmission between the drive motor and the drive roller. The self-locking transmissions ensure that the drive roller cannot be rotated by an external influence, e.g. by an action of the trailer wheel, but exclusively by the drive motor. The self-locking feature thus ensures that the drive roller blocks at standstill, when the drive motor is not activated, and in so far serves as brake.

What is disadvantageous is the small efficiency of such self-locking transmissions. Due to the electric resources frequently limited in trailers, correspondingly large batteries must be provided, in order to provide the required electric energy for operating the maneuvering drive.

According to the invention, there is proposed a transmission with higher efficiency, which is not self-locking, i.e. has no self-locking feature. By means of the additional or separate braking means, a reliable braking of the drive roller nevertheless is ensured. By arranging this braking means coaxially to the drive motor, a compact construction can be realized, which only requires a limited additional constructional design and possibly even less components.

The drive motor can include a drive shaft, wherein the braking means can be arranged on the drive shaft. This means that the drive motor applies its drive power onto the drive shaft, while the braking means in turn likewise is able to directly introduce the braking torque into the drive shaft. The drive shaft thus becomes the central drive component of the maneuvering drive.

The braking means can be arranged on the end face of the drive motor.

In one embodiment, a transmission means can be provided in the flux of force between the drive motor and the drive roller, wherein a drive gear belonging to the transmission means is provided on the drive shaft. The drive gear can be put onto the drive shaft as separate gear wheel. It is also possible to cut the drive gear directly onto the drive shaft. The transmission means can be expedient to reduce the speed of the drive motor and convert it into a suitable speed for the drive roller. Correspondingly, the driving torque generated by the drive motor can be increased. At least a part of control electronics for the drive motor can be arranged on the end face of the drive motor, wherein the control electronics can include a board which is penetrated by the drive shaft. Alternatively or in addition, at least a part of the control electronics can be arranged laterally of the drive motor. Due to these arrangements it is possible to arrange the control electronics directly at the drive motor, so that only very short line paths are required. Due to the high electric powers required by the drive motor, correspondingly high electric currents must be supplied to the drive motor. This applies even more when the operating voltage of the drive motor is lowered for safety reasons and for example lies in the range of usually battery voltages (such as for example 12 Volt, 24 Volt or 48 Volt). The high electric currents can impair the electromagnetic compatibility (EMC). This disadvantage is counteracted by the very short line paths between the control electronics and the drive motor.

When the drive shaft penetrates the board of the control electronics, for example through a corresponding bore or recess, the control electronics can be arranged directly close to the end face of the motor with a very good utilization of installation space.

The drive motor can include a bearing plate on its end face. The bearing plate thus can be part of the drive motor in the form of an end shield. It is also possible that the bearing plate or the end shield of the drive motor is fixed on a further carrier plate.

Alternatively or in addition, the control electronics can be arranged on the bearing plate, e.g. can be fixed on the bearing plate. By means of the bearing plate it then is possible to comfortably preassembly the drive motor and possibly the control electronics, before the entire unit then is mounted in the maneuvering drive or attached to the carrier.

Between the bearing plate and the control electronics a plug connection can be provided for transmitting an electric current. The plug connection can include a plurality of plug contacts whose components each are held by the bearing plate and by the control electronics. When assembling the control electronics on the bearing plate, the components of the plug connection are put together, so that an electric contact can directly be made. In simple terms, it thus is possible to pass the current provided by the control electronics for actuating the motor through the bearing plate and supply it to the motor.

In one embodiment, a ventilation means is provided for cooling the drive motor, wherein the ventilation means is arranged on the drive shaft. In this way, the ventilation means likewise is driven directly by the drive shaft, so that no additional constructional effort is required. It can also directly be integrated into the drive motor, in that e.g. vanes of a cooling fan wheel are provided at a rotor of the drive motor.

At least two of the following components can be arranged on a common axle, possibly even be arranged coaxially to each other in the axial order indicated below: braking means, drive motor, bearing plate, control electronics, drive gear. This means that from this list at least two, expediently also more components can be selected, which then must be arranged in the order relative to each other, as it is specified by the list. Thus, when all components are to be mounted, they must be arranged axially in the order braking means—drive motor—bearing plate—control electronics—drive gear.

The drive motor can be a brushless electric motor with external rotor. In the prior art, it is common practice that the drive motor is designed as brushed motor, for example as universal motor. A brushless electric motor on the other hand has the advantage of being very precisely controllable in its speed. This provides for specifying different speeds of the drive rollers with high accuracy in operation of the maneuvering drive. An external rotor motor in addition has the advantage that it produces a higher torque than an internal rotor motor. Due to the increased torque, the speed of the motor also can be reduced, which has an advantageous effect for the design of a transmission required between the drive motor and the drive roller, in particular for the demand placed on the gear ratios.

Due to the construction of an external rotor motor, the construction volume and the weight also can noticeably be reduced, so that a high power-to-weight ratio can be achieved. In addition, the external rotor motor is easier to cool than an internal rotor motor.

The drive motor can include a bearing plate on its end face. Alternatively or in addition, the control electronics can be arranged on the bearing plate. It is also possible that the drive motor is attached to a bearing plate on the end face. By means of the bearing plate it is possible to comfortably preassemble the drive motor and possibly the control electronics, before the entire unit then is mounted in the maneuvering drive.

The drive motor can be arranged outside the drive roller, which reduces the constructive and constructional effort.

The braking means can be attached directly to the external rotor. In this way, the braking means can prevent the motor or external rotor from rotating, which consequently also leads to a blocking of the drive roller. It is also possible that the braking means is arranged directly in the external rotor, quasi as part of the bell of the bell-shaped external rotor.

In one option, the braking means can be attached to the motor housing, i.e. to a housing surrounding the drive motor. It hence is possible to arrange the braking means spatially very close to the motor.

Depending on the option, the braking means can serve as parking or holding brake or be utilized for regulating the speed, for example during downhill driving of the trailer.

Regulating the speed is possible e.g. with electric braking principles. The braking means thus can act according to the principle of countercurrent braking, so that an oppositely directed current produces the required braking torque. DC braking also is conceivable. Other electric brakes operate as eddy-current brake, hysteresis brake or magnetic-powder brake.

For realizing an electric brake it is possible for example to produce a braking effect by the drive motor with the aid of a winding short-circuit.

In the present case, however, the focus is on the configuration of the braking means as mechanical braking means or as electromechanical braking means, for example as magnetic brake, in order to realize the braking means as parking brake. Only in a case of emergency, the parking brake serves to slow down the travel of the trailer or the rotation of the drive roller. The parking brake rather is meant to ensure that the drive roller is held at standstill.

When the braking means is designed as parking brake and braking during the travel merely is effected by an electrical braking of the drive motor (e.g. the above winding short-circuit), the provision of the braking means as parking brake represents double safety. The braking means then can additionally be activated if necessary, when the electrical motor braking is not sufficient.

Magnetic brakes can be designed as cone, shoe or multidisk brakes.

The drive motor can include an internal stator, wherein the external rotor surrounds the internal stator in a bell-shaped manner. It may be advantageous when the external rotor includes a cooling fan wheel, i.e. the cooling fan wheel is integrated directly into the bell of the external rotor.

In modern maneuvering drives attention increasingly is paid to the fact that they have a visually appealing design, which in particular leads to the fact that the technical function carriers are covered by correspondingly designed trim panels. Especially with longer maneuvering operations with the maneuvering drive, however, an effective motor cooling is necessary. When utilizing the external rotor motor, the cooling fan wheel can be integrated into the external rotor or into the bell of the external rotor, so that a separate blower need not be attached to the motor shaft.

The internal stator can be integrated to form a constructional unit with the bearing plate. In particular, the internal stator can include a sleeve or hub surrounding the motor shaft, which is integrally connected with the bearing plate.

Depending on the construction of the maneuvering drive, the axis of rotation of the drive motor can extend parallel or vertically or at an oblique angle, i.e. neither parallel nor vertically, to the axis of rotation of the drive roller. Since the brushless external rotor motor with the coaxially attached braking means has a very compact construction, it is suitable in principle for each of these arrangements.

One aspect of the invention provides that in the drive train of the maneuvering drive a resilient coupling means is provided, via which inclined and/or non-parallel shafts can be coupled with each other and/or a vibration damping is effected. The running property of the maneuvering drive is improved thereby.

DETAILED DESCRIPTION OF PREFERRED EMBODIMENTS

Figure 1:
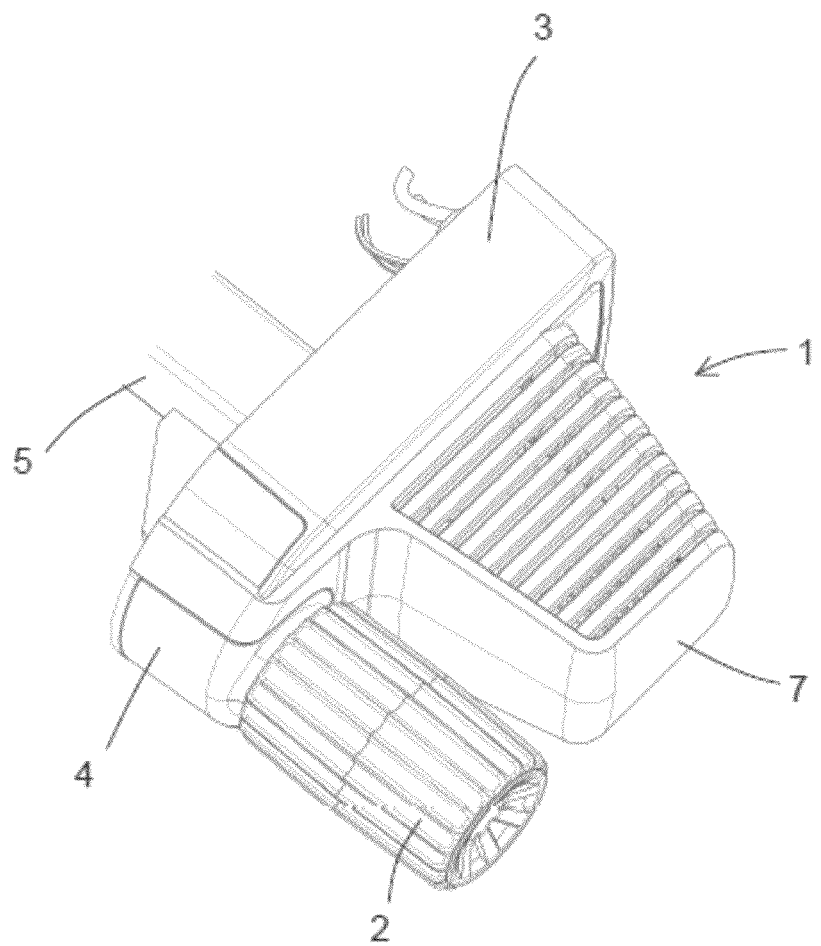
FIG. 1 shows an example for a perspective external view of a maneuvering drive.

FIG. 1 shows a perspective view of a maneuvering drive with a drive motor 1 arranged under a cover 7 and a drive roller 2 rotatably drivable by the drive motor 1.

The drive motor 1 and the drive roller 2 are held by a carrier 3. In the interior of the carrier 3 there is also arranged a transmission means 4 which serves to convert the relatively high speed of the drive motor 1 into a lower speed for the drive roller 2. In FIG. 1, the transmission means 4 only is shown in an external view. In particular, the transmission means 4 can include several steps, in order to achieve the desired total gear ratio. The carrier 3 is held by a fastening means 5, which in turn can be mounted on a non-illustrated chassis of a trailer. For example, the fastening means 5 can be designed in the form of a square tube which can be pushed onto a corresponding transverse tube (not shown), wherein the transverse tube in turn is attached to the bottom side of the trailer.

The carrier 3 is linearly reciprocable relative to the fastening means 5 by means of a non-illustrated moving means. For this purpose, the fastening means 5 can include a holder in which the carrier 3 can be guided, so that it can e.g. linearly be reciprocated. In this way, the carrier 3 can reciprocated between a rest position in which the drive roller 2 is separated from a wheel of the trailer not shown in FIG. 1, and a drive position in which the drive roller 2 is pressed against the wheel of the trailer.

Figure 2:
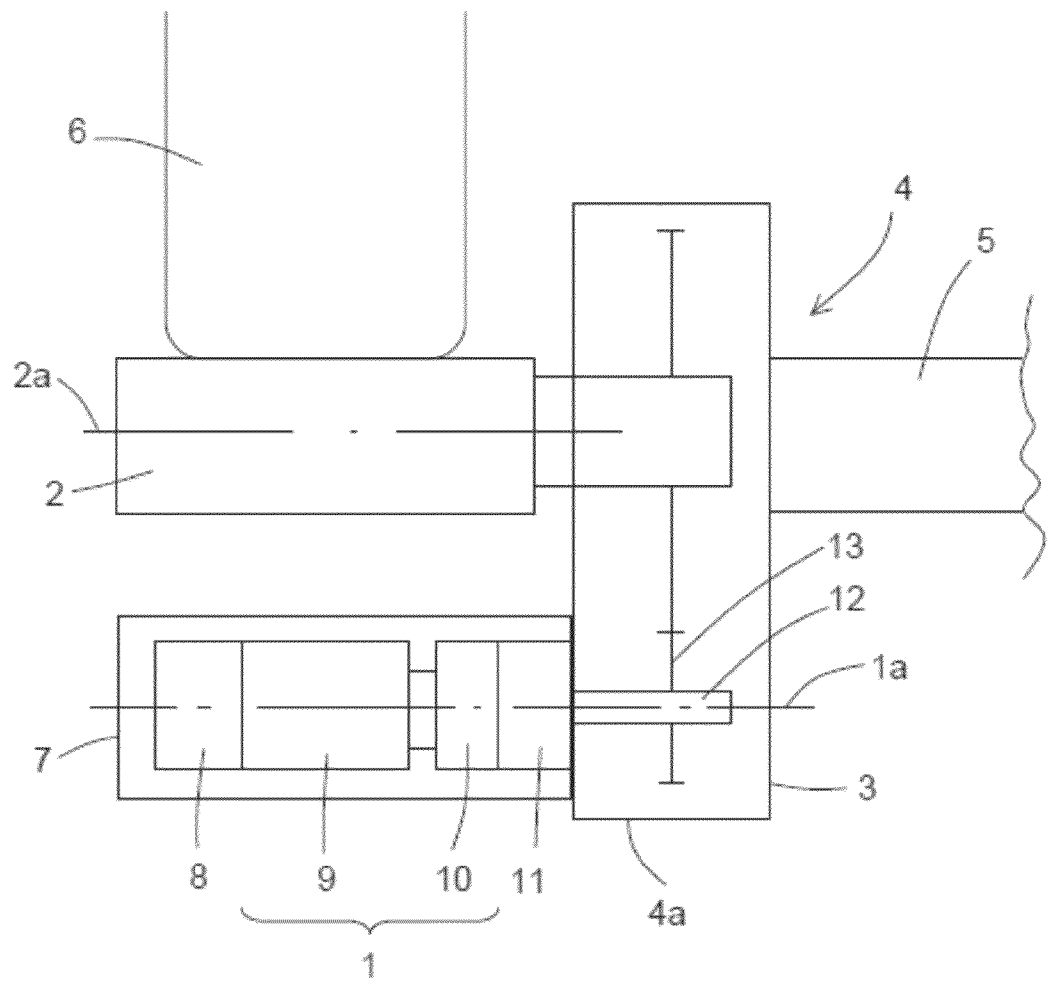
FIG. 2 shows a schematic top view with partial sectional representation of a maneuvering drive with parallel axes of rotation of drive motor and drive roller.

FIG. 2 shows the construction of the maneuvering drive of FIG. 1 in a schematic sectional representation.

The maneuvering drive is shown in a condition in which the drive roller is pressed against a wheel 6 of the trailer (drive position).

The drive motor 1 is constructed as brushless electric motor with external rotor and is covered by the cover 7. On the end face, namely on the rear end face of the drive motor 1 a braking means 8 is provided coaxially to the drive motor 1, which is employed in particular during standstill of the drive motor 1 and should prevent an inadvertent rotation of the drive roller 2.

The braking means 8 is arranged on the end face of an external rotor 9 of the drive motor 1 and directly acts on a motor shaft serving as drive shaft 12. The external rotor 9 surrounds an internal stator 10 in a bell-shaped manner, of which internal stator FIG. 2 only shows the part protruding out of the external rotor 9. The internal stator 10 in turn is attached to a bearing plate 11, so that the bearing plate 11 supports both the drive motor 1 and the braking means 8 held by the drive motor 1.

The bearing plate 11 also can be integrated into the internal stator 10 or be formed integrally with the internal stator 10. In this case, the part of the internal stator 10 guided out of the external rotor 9 is formed as end shield which serves as bearing plate 11.

In or at the bearing plate 11, a non-illustrated electronic motor controller or components of the control electronics can also be mounted. The bearing plate 11 in turn is attached to the carrier 3. In particular, the bearing plate 11 can directly be flange-mounted to a transmission housing 4a of the transmission means 4. The transmission housing 4a can be formed e.g. of two housing shells.

Of course, it is also possible to mount the drive motor 1 directly on the carrier 3 or the transmission housing 4a by means of its end shield connected with the internal stator 10, without interposition of a separate bearing plate 11.

The motor shaft or drive shaft 12 of the drive motor 1 protrudes into the interior of the transmission means 4, so that the rotary movement can be converted into a suitable movement for the drive roller 2 by the transmission means 4. On the drive shaft 12 a drive gear 13 as drive pinion is provided as part of the transmission means 4. The diameter of the drive gear 13 of course can be much smaller than is shown in FIG. 2. It is possible for example to cut the drive gear 13 directly onto the drive shaft 12.

The axis of rotation 1a of the drive motor 1 and the axis of rotation 2a of the drive roller 2 are parallel to each other in the variant of FIGS. 1 and 2.

Figure 3:
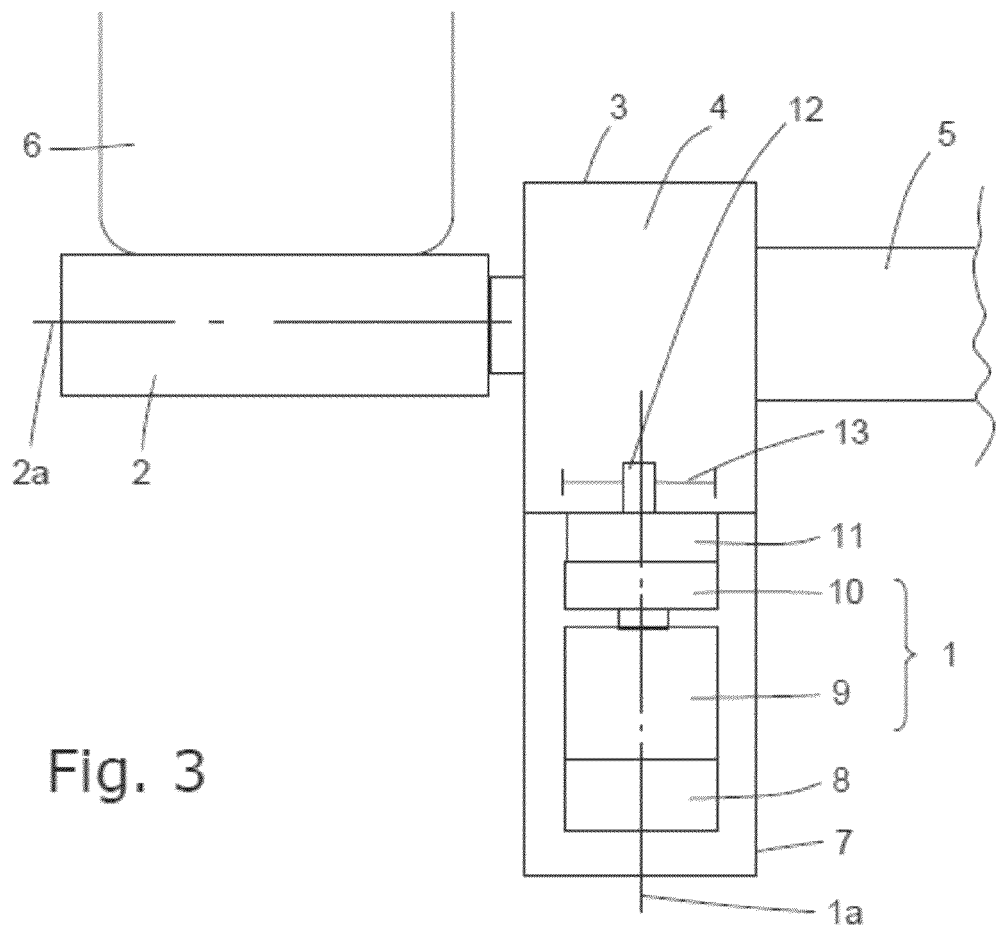
FIG. 3 shows a schematic top view of a maneuvering drive with axes of rotation of drive roller and drive motor extending at right angles to each other.

FIG. 3 shows another embodiment for a maneuvering drive, in which the axis of rotation 1a of the drive motor 1 is vertical to the axis of rotation 2a of the drive roller 2. The further components of the maneuvering drive substantially are constructed identically, so that a detailed description can be omitted.

The transmission means 4 merely must be designed such that it can convert the rotary movement of the drive motor 1 over the angle of 90°. For this purpose, for example bevel-gear drives or worm-gear drives can be used.

In the variant of FIG. 3 the drive motor 1 also is designed as brushless electric motor with external rotor 9.

The braking means 8 of FIGS. 2 and 3 is arranged on the end face of the external rotor 9 and can directly act onto the drive shaft 12. For this purpose, the drive shaft 12 must be extended or protrude on the side of the external rotor 9 facing away from the end shield, so that the braking torque can be introduced into the drive shaft 12.

The control electronics for the drive motor 1 can be arranged directly on the bearing plate 11 or the end shield. For example, the components of the control electronics can be soldered onto a board which in turn is suitably fixed on or at the bearing plate 11 or the end shield.

Figure 4:
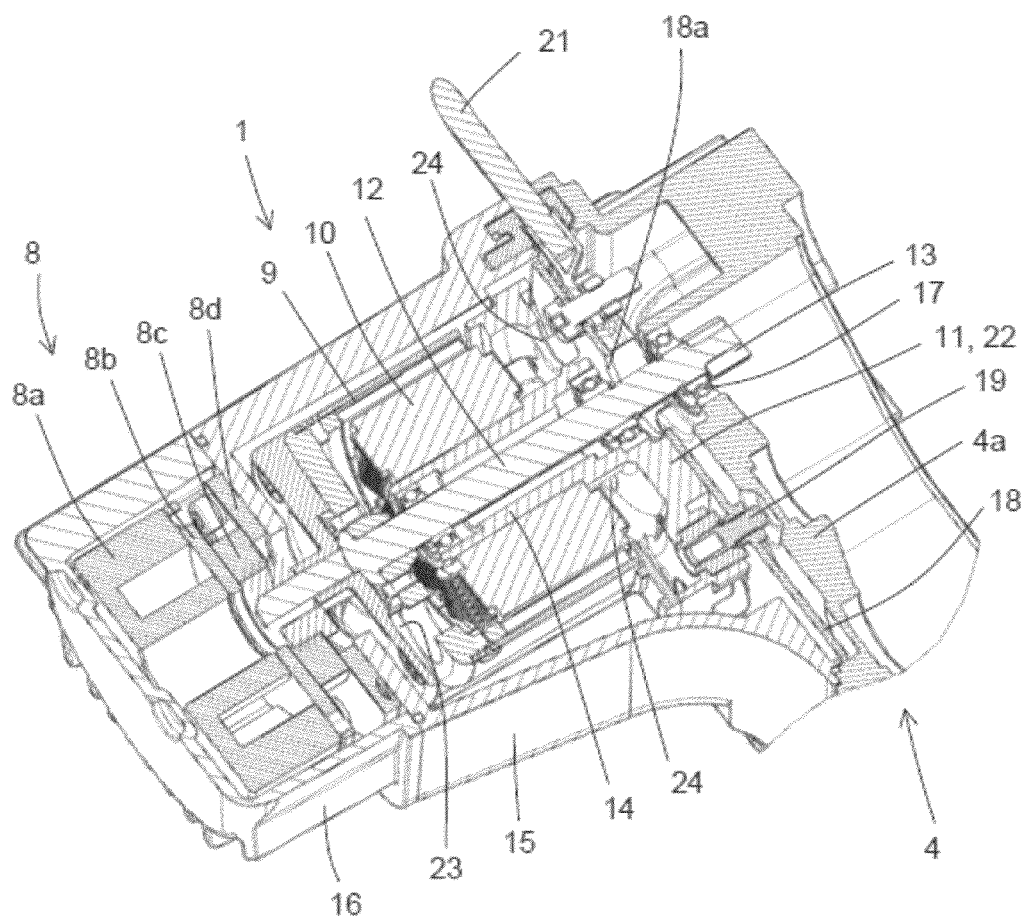
FIG. 4 shows a sectional representation of a part of a maneuvering drive as shown in FIG. 2.

FIG. 4 shows the region of the drive motor 1 with the drive shaft 12 in a sectional representation with more details. The cover 7 shown in FIG. 1 is omitted in FIG. 4. It serves to provide the maneuvering drive with an appealing outer appearance and an appropriate design.

The drive motor includes the external rotor 9 which surrounds the internal stator 10 in a bell-shaped manner. The external rotor 9 is positively connected with the drive shaft 12, in order to introduce the driving torque into the drive shaft 12.

The drive shaft 12 is mounted in a sleeve-like hub 14 which in turn also carries the internal stator 10 or is integrally connected with the same.

At the front end of the hub 14 the bearing plate 11 is formed as end shield of the drive motor 1 and integrally connected with the hub 14. The bearing plate 11 is attached to the inside of a motor housing 15 via non-illustrated screw connections, so that the entire drive motor 1 thereby is attached to the motor housing 15.

On the rear end face of the drive motor 1, the braking means 8 is attached to the motor housing 15. Under a brake housing 16, which likewise is mounted on the motor housing 15, a magnetic brake is incorporated as braking means 8. The braking means includes a magnetic coil 8a which acts on a non-illustrated spring-loaded armature. The armature is arranged in the free space which in FIG. 4 is indicated in the magnetic coil 8a. Furthermore, a pressure plate 8b is provided, against which the spring-loaded armature presses when the magnetic coil 8a is not excited. The pressure plate 8b in turn presses against the brake disk 8c, which is arranged axially between the pressure plate 8b and a mounting plate 8d. The mounting plate 8d is firmly screwed to the motor housing 15, while the brake disk 8c is fixed, e.g. positively mounted, on the drive shaft 12.

The brake disk 8c rotating in operation thus directly acts on the end of the drive shaft 12. In this way, the braking means 8 immediately can directly block the drive shaft 12 via the brake disk 8c.

The braking effect of the braking means 8 occurs in the de-energized condition, so that the drive shaft 12 is blocked effectively. In this condition, the spring-loaded armature is pressed against the pressure plate 8b, so that the brake disk 8c between the pressure plate 8b and the mounting plate 8d is prevented from rotating due to friction. In the energized condition, however, the armature is attracted by the magnetic coil 8a against the spring action and is lifted off from the pressure plate 8b. The brake disk 8c then can freely rotate with the drive shaft 12. In this condition, the magnetic brake in the braking means 8 acts such that the brake is released and the drive shaft 12 can rotate freely.

The brake disk 8c of the braking means 8 can e.g. positively be connected with the drive shaft 12, in order to ensure safe braking of the drive shaft 12. A positive connection also exists between the external rotor 9 and the drive shaft 12.

At the opposite end of the drive shaft 12 the drive gear 13 can be seen as part of the transmission means 4.

Directly beside the drive gear 13 a bearing 17 is provided, with which the drive shaft 12 is mounted in the transmission housing 4a of the carrier 3. In this way, the entire unit of drive motor 1 and braking means 8 also can be centered with respect to the transmission means 4 and the transmission housing 4a, respectively.

On the side of the bearing plate 11 facing away from the drive motor 1 a board 18 is attached, which carries at least a part of the control electronics for the motor control of the drive motor 1. The board 18 includes a recess 18a through which the drive shaft 12 extends. Thus, this part of the control electronics can directly be attached to the bearing plate 11 and hence to the drive motor 1, which among other things considerably facilitates the assembly. In addition, very short line paths thus can be realized between the control electronics and the drive motor 1.

In particular, a plurality of connectors 19 are provided between the control electronics or the board 18 and the bearing plate 11, of which however only one is shown in FIG. 4. Via the connectors 19, for example, the electric current can be guided from the control electronics to the drive motor 1 or its internal stator 10.

By means of the connectors 19 it is possible to further simplify the assembly of the board 18 on the bearing plate 11. Thus, the board 18 merely must be pressed onto the bearing plate 11, in order to achieve a contacting of the connectors 19. Further connections between the drive motor 1 and the control electronics then are not required.

Figure 5:
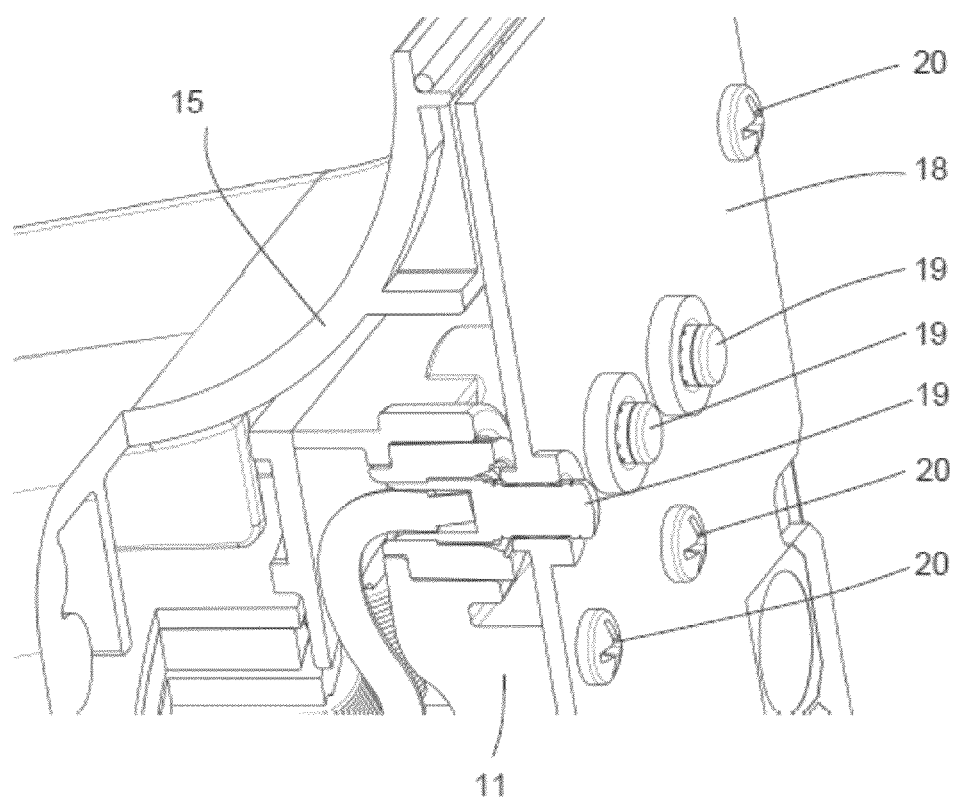
FIG. 5 shows a detail enlargement of a bearing plate with control board.

In the region of the connectors 19, FIG. 5 shows a partial sectional representation with more details. In particular, it can be seen that the board 18 is attached to the bearing plate 11 by means of screws 20 and the contact is held in the connectors 19.

The voltage supply to the board 18 can be effected via cable supply lines 21, of which merely one is shown in FIG. 4.

The braking means 8, the drive motor 1, the bearing plate 11, the control electronics with the board 18, and the drive gear 13 are arranged coaxially to each other in this order. In this way, a particularly compact construction can be realized, which however can easily be (pre)assembled.

In one variant it is possible to change the axial order to the effect that the drive gear 13 is arranged axially between the drive motor 1 and the braking means 8. In this case, the braking means 8 thus must be arranged opposite the drive motor 1 with respect to the drive gear 13.

It is also possible to arrange the braking means 8 between the drive motor 1 and the gear wheel 13. This may be advantageous for example for the purpose of cooling.

By means of the connectors 19 it is possible to limit the electric connection work for the drive motor 1 to a minimum.

The external rotor 9 encloses the upright internal stator 10 like a bell. The drive shaft 12 is attached to the external rotor 9 and is guided through the interior of the internal stator 10 or through the sleeve or hub 14 forming a part of the internal stator 10. Correspondingly, the external rotor 9 with the drive shaft 12 is mounted on the internal stator 10 or the hub 14.

An end shield 22, which serves as bearing plate 11, is integrally connected with the internal stator 10. The bearing plate 11 also can be formed as separate part, so that the internal stator 10 can be mounted on the bearing plate 11.

In the end-face part of the external rotor 9, vanes of a cooling fan wheel 23 are integrated. Upon rotation of the external rotor 9, the vanes of the cooling fan wheel 23 generate an air stream which is utilized for cooling the drive motor 1. For a sufficient air supply, vent openings 24 are provided.

Figure 6:
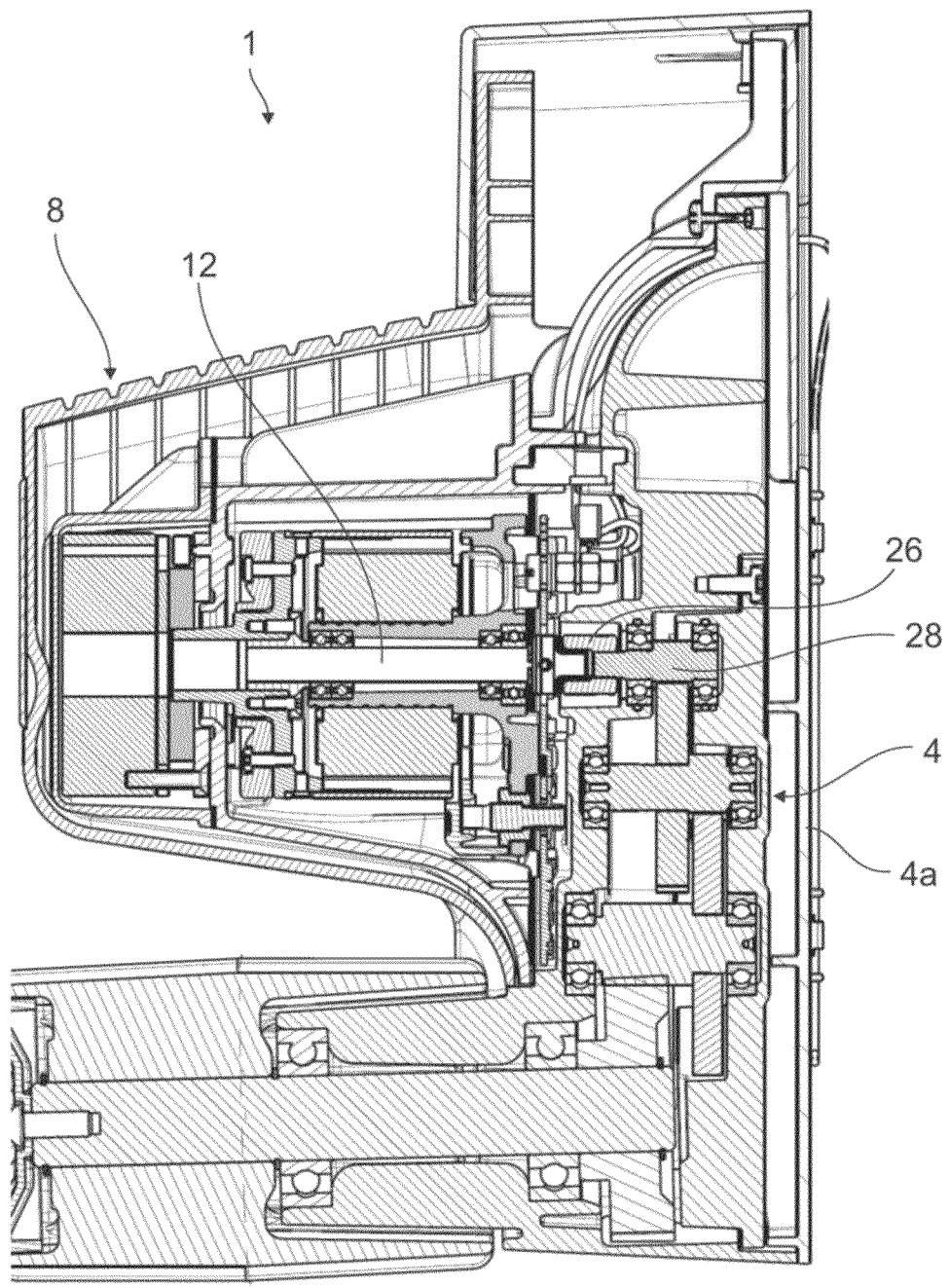
FIG. 6 shows a sectional representation of a part of a maneuvering drive according to a further embodiment.

FIG. 6 shows a further embodiment of the maneuvering drive, which differs from the above-described embodiment in that in the illustrated drive train a resilient coupling means 26 additionally is provided, which in particular can be formed in the transmission means 4 or in the transmission housing 4a. The coupling means 26 is provided for vibration damping and/or for bridging shafts extending slightly obliquely and/or not parallel to each other and/or for compensating fit tolerances in the motor attachment.

The coupling means 26 connects the drive shaft 12 of the drive 1 with the transmission means 4, wherein for coupling a pinion 28 typically is provided. Such coupling can of course also be provided on other shaft connections, also in the region of the brake.

The coupling means 26 is a shaft coupling damping torsional vibrations, in particular a claw coupling or a bellows coupling.

The shaft coupling preferably is arranged between the motor-side shaft and the first pinion of the transmission.

Figure 7A:
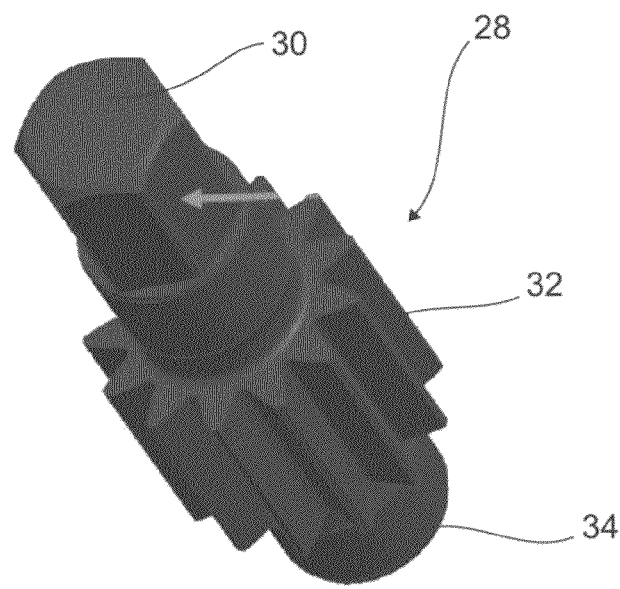
FIG. 7 shows an example for a usable pinion (FIG. 7a) and a usable coupling means (FIG. 7b).
Figure 7B:
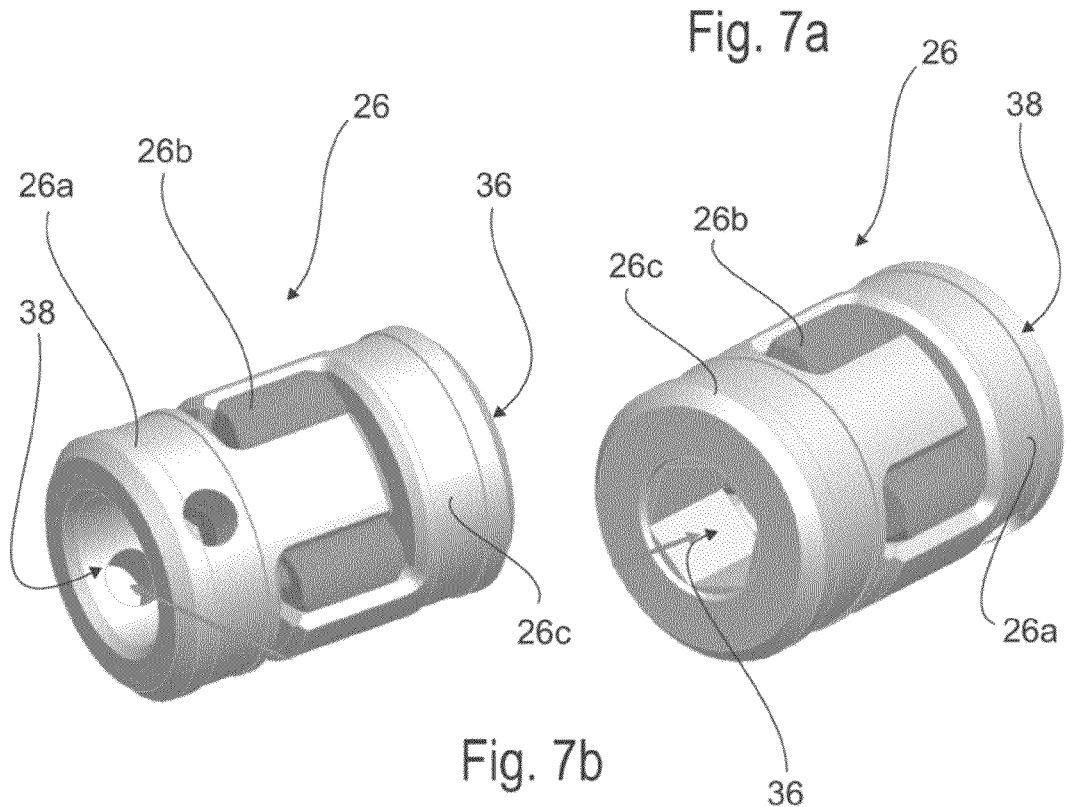

For damping, the shaft coupling typically is constructed of at least three parts (FIG. 7b). A first part 26a with axially protruding fingers serves for coupling with the drive shaft 12. The torque or the rotary movement transmitted by the drive shaft 12 is transmitted via a second part 26b, which consists of an elastomer, to the third part 26c likewise having axial fingers, which is coupled with the transmission means 4 and which due to the resilience of the second part 26b can easily be rotated with respect to the first part 26a. The second part 26b extends between adjacent fingers of the first and the third part 26a and 26c.

The second part 26b in particular can be formed as elastomer star.

The coupling means 26 thus is an elastomer coupling.

A pinion 28 usable in the coupling means 26 as well as an exemplary coupling means 26 are shown in FIG. 7.

The pinion 28 is designed such that it comprises a first axial end portion 30, on which a polygonal profile is formed, a main part 32 including the pinion portion, and a second axial end portion 34, which primarily serves for supporting the pinion 28 in the transmission means 4.

The pinion 28 can be coupled with a receptacle 36 of the coupling means 26 via the polygonal profile formed at the first axial end portion 30 (FIG. 7b). For this purpose the receptacle 36 likewise has a polygonal profile, so that the pinion 28 can positively be inserted or plugged into the receptacle 36.

Via the pinion 28 designed in this way and the corresponding coupling means 26, the torque of the drive 1 can effectively be transmitted to the transmission means 4, wherein for this purpose the pinion 28 need not be secured in the coupling means 26 by means of a pin or the like.

In the illustrated embodiment of the coupling means 26, the drive shaft receptacle 38 opposite to the receptacle 36 is formed such that the drive shaft 12 must be pinned or is secured by other suitable locking possibilities (possibly geometrical component designs), in order to be safely fixed with the coupling means 26.

In an alternative embodiment, however, the drive shaft receptacle 38 and the drive shaft 12 likewise can be formed with a polygonal profile.

Alternatively, it is also imaginable that the coupling means 26 is fixed via an adhesive connection.

The invention claimed is:

1. A maneuvering drive for a trailer, comprising:
a fastening means for fastening to the trailer;
a carrier movable relative to the fastening means;
a drive motor held by the carrier;
a drive roller rotatably drivable by the drive motor; and
a braking means for braking a rotary movement of the drive roller;
wherein the drive motor and the braking means are arranged coaxially to each other;
wherein in the flux of force between the drive motor and the drive roller a transmission means is provided, which has no self-locking feature; and
wherein the trailer comprises at least one wheel, the carrier being movable between a rest position, in which the drive roller is separated from a wheel of the trailer, and a drive position in which the drive roller is pressed against the wheel of the trailer.

2. The maneuvering drive according to claim 1, wherein the drive motor comprises a drive shaft, and the braking means is arranged on the drive shaft.

3. The maneuvering drive according to claim 1, wherein a drive gear belonging to the transmission means is provided on a drive shaft.

4. The maneuvering drive according to claim 1, wherein the drive motor comprises a bearing plate at the end face.

5. A maneuvering drive for a trailer, comprising:
a fastening means for fastening to the trailer;
a carrier movable relative to the fastening means;
a drive motor held by the carrier;
a drive roller rotatably drivable by the drive motor; and
a braking means for braking a rotary movement of the drive roller;
wherein the drive motor and the braking means are arranged coaxially to each other;
wherein in the flux of force between the drive motor and the drive roller a transmission means is provided, which has no self-locking feature; and
wherein a control electronics for the drive motor is provided, at least a part of the control electronics for the drive motor being arranged on at least one of the end face of the drive motor, wherein the drive motor comprises a drive shaft, wherein the control electronics include a board which is penetrated by the drive shaft, and wherein at least a part of the control electronics is arranged laterally of the drive motor.

6. The maneuvering drive according to claim 5 wherein the drive motor comprises a bearing plate on the end face, and a plug connection is provided between the bearing plate and the control electronics for transmitting an electric current.

7. The maneuvering drive according to claim 1, wherein at least two of the following components are arranged on a common axis relative to each other in the following axial order:
braking means;
drive motor;
bearing plate;
control electronics; and
drive gear.

8. The maneuvering drive according to claim 1, wherein the drive motor is a brushless electric motor with an external rotor.

9. The maneuvering drive according to claim 8, wherein the maneuvering drive comprises a motor housing, and the braking means is attached to one of the external rotor and the motor housing.

10. The maneuvering drive according to claim 1, wherein the axis of rotation of the drive motor extends one of parallel, vertically and at an oblique angle to the axis of rotation of the drive roller.

11. The maneuvering drive according to claim 1, wherein the maneuvering drive comprises a drive train, and a resilient coupling means is provided in the drive train.

12. The maneuvering drive according to claim 5, wherein the drive motor comprises a bearing plate on the end face, and the control electronics is fixed on the bearing plate.

13. A maneuvering drive for a trailer, comprising:
a fastening means for fastening to the trailer;
a carrier movable relative to the fastening means;
a drive motor held by the carrier;
a drive roller rotatably drivable by the drive motor; and
a braking means for braking a rotary movement of the drive roller;
wherein the drive motor and the braking means are arranged coaxially to each other;

wherein in the flux of force between the drive motor and the drive roller a transmission means is provided, which has no self-locking feature; and wherein a ventilation means is provided for cooling the drive motor, and the ventilation means is arranged on the drive shaft.

14. A maneuvering drive for a trailer, comprising:

a fastening means for fastening to the trailer;

a carrier movable relative to the fastening means;

a drive motor held by the carrier;

a drive roller rotatably drivable by the drive motor; and a braking means for braking a rotary movement of the drive roller;

wherein the drive motor and the braking means are arranged coaxially to each other;

wherein in the flux of force between the drive motor and the drive roller a transmission means is provided, which has no self-locking feature;

wherein the drive motor is a brushless electric motor with an external rotor; and wherein a ventilation means is provided for cooling the drive motor, and the drive motor comprises an internal stator, the external rotor surrounds the internal stator in a bell-shaped manner, and the external rotor comprises a cooling fan wheel belonging to the ventilation means.

* * * * *